Dec. 4, 1934.  O. WILSON  1,982,893
ANTIFRICTION BEARING
Filed May 19, 1934
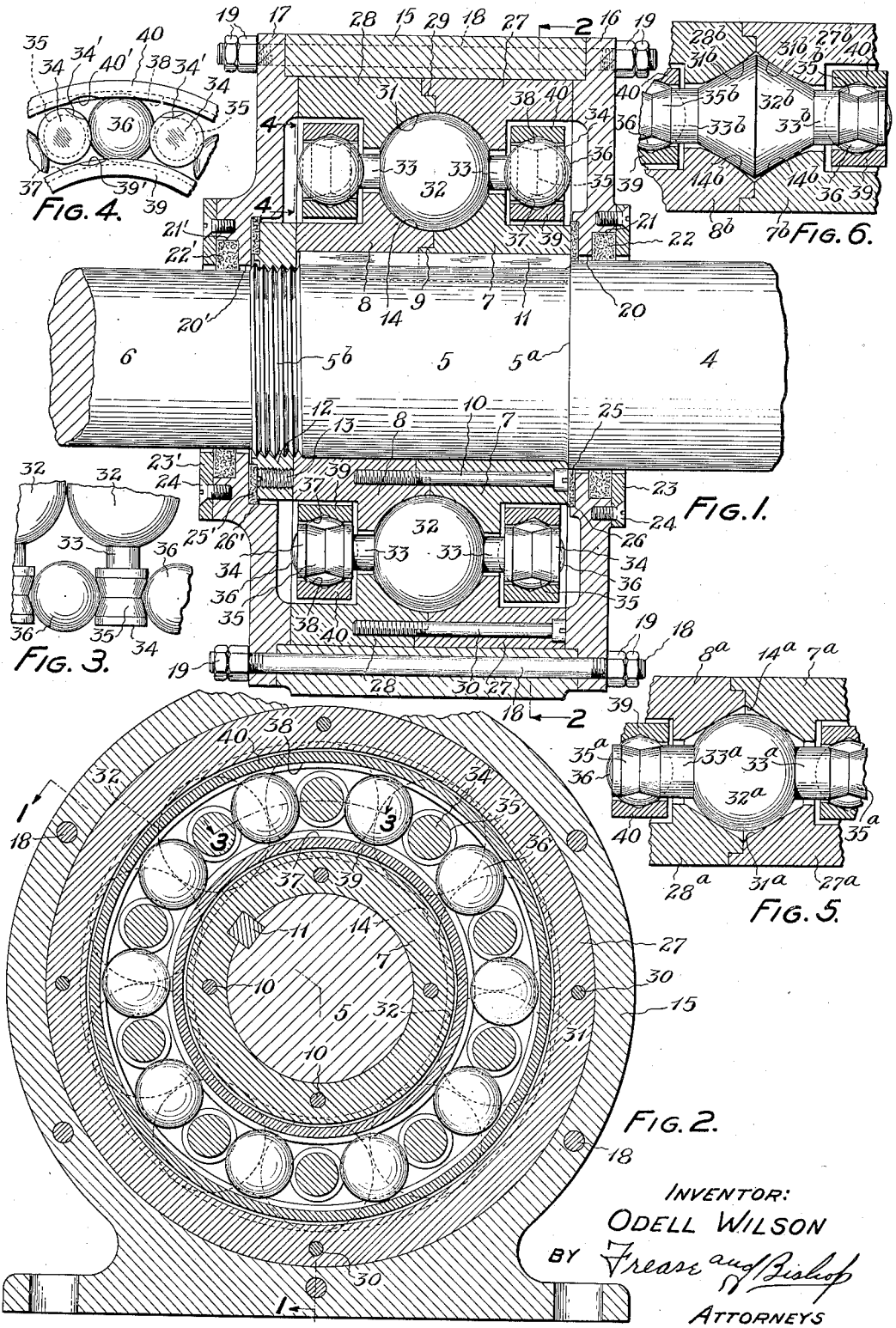
INVENTOR:
ODELL WILSON
BY Frease and Bishop
ATTORNEYS Patented Dec. 4, 1934

1,982,893

UNITED STATES PATENT OFFICE 1,982,893

ANTIFRICTION BEARING

Odell Wilson, Auburn, Calif.

Application May 19, 1934, Serial No. 726,543

6 Claims. (Cl. 308—206)

The invention relates to anti-friction bearings, and more particularly to a bearing construction including rotatable bearing members which carry both thrust and radial loads in which the bearing may be operated for an indefinite period of time without grease or other liquid lubricant.

Furthermore, the invention relates to an anti-friction bearing construction of the type in which means is utilized for properly spacing the rotatable bearing members apart so that they will not come in contact with each other, as set forth in my prior Patents Nos. 1,111,500 and 1,188,126.

In the constructions shown in my prior patents, cylindrical rollers are utilized for carrying the radial loads, and two sets of thrust ball bearings are utilized for carrying the thrust loads. Thus, a great many additional parts are necessary in my prior constructions in order to provide for carrying both radial and thrust loads.

It is therefore an object of the present invention to provide an anti-friction bearing in which the rotatable load bearing members carry both thrust and radial load, and in which the rotatable members are maintained spaced apart so that they will not come in contact with each other.

It is a further object of the present invention to provide an anti-friction bearing having rotatable bearing members carrying both thrust and radial loads; which may be operated for an indefinite period of time without grease or other liquid lubricant; and which may be completely and substantially permanently sealed up so as to prevent dirt, grit and comminuted particles, which may be present in the region of the place of operation of the bearing, from accumulating or gathering in and around the bearing parts.

Furthermore, it is an object of the present invention to provide an anti-friction bearing requiring no lubricant and having rotatable bearing members carrying both thrust and radial loads, in which only pure rolling motion occurs between all relatively movable contacting parts of the bearing.

And finally, it is an object of the present invention to provide an improved and simplified anti-friction bearing construction incorporating all of the described desiderata, which requires only a relatively small number of parts in its construction and which is efficient in operation and use.

These and other objects may be obtained by the improved anti-friction bearing construction, preferred embodiments of which are shown in the accompanying drawing and are hereinafter described in detail and claimed, which may be stated in general terms as including in anti-friction bearing construction, inner and outer raceway members and rotatable thrust and radial load bearing members rolling on and between the raceway members, two preferably grooved trunnions projecting axially of the bearing from each rotatable member between the raceway members, series of spacing balls between the trunnions, and separate concentric floating raceway rings retaining each series of balls.

In the drawing,

Figure 1 is an axial section of an embodiment of the improved bearing construction utilized for journaling a rotating shaft, taken on the line 1—1 of Fig. 2;

Fig. 2 is a transverse section through the improved bearing, taken on the line 2—2, Fig. 1;

Fig. 3 is a partial plan section through the rotatable load bearing members taken in the cylindrical plane indicated at 3—3, Fig. 2;

Fig. 4 is a fragmentary end view of one of the sets of trunnion ends and the spacing balls and raceway rings therefor, taken from the plane indicated by the line 4—4, Fig. 1;

Fig. 5 is a fragmentary sectional view similar to a portion of Fig. 1, showing a modified type of construction for the inner and outer raceways of the rotatable load bearing members; and Fig. 6 is a fragmentary sectional view similar to a portion of Fig. 1, showing another modified type of construction for the inner and outer raceways and the rotatable load bearing members.

Similar numerals refer to similar parts throughout the drawing.

Although it is to be understood that the anti-friction bearing construction of the present invention is applicable to any installation where there is to be relative rotary motion between the parts, as between a wheel or the like rotating on a stationary shaft or between a rotating shaft journaled in a stationary housing, the particular embodiment shown and described is one in which a stationary bearing housing is utilized for journaling a rotating shaft.

The shaft is generally indicated at 4 and may include a journal portion 5 terminating at one end in an abutment shoulder 5a and at the other end in a threaded portion 5b, which may continue in the shaft portion 6 of reduced diameter from the main shaft 4. An inner annular raceway member may be fixed to the journal portion 5 of the shaft by utilizing, for convenience of manufacture and assembly, two inner raceway portions 7 and 8, rabbeted together at 9, bolted together by bolts 10, keyed to the shaft portion 5 at 11, and clamped against the shoulder 5a by the nut 12 which may preferably be provided with a set screw 13. Thus, the inner raceway member portions 7 and 8 and the securing, clamping and mounting parts therefor may be collectively referred to as an inner raceway member having a generally concaved, preferably curved annular raceway 14, formed therein.

The journal box preferably comprises a housing member 15 to the ends of which are secured flanged end plates 16 and 17, as by through bolts 18 and nuts 19. The end plates 16 and 17 are provided with central openings 20 and 20', respectively, which may be recessed at 21 and 21' to receive annular washers 22 and 22' of felt or other suitable material and the washers are clamped to the end plates by the rings 23 and 23' which are preferably secured thereto by screws 24.

An additional felt washer 25 is preferably interposed in a recess 26 between the end plate 16 and the inner raceway portion 7; and an additional felt washer 25' is preferably interposed in a recess 26' between the end plate 17 and nut 12.

The felt washers 22, 22', 25 and 25' accordingly provide sealed and dust proof joints between the ends of the journal box and shaft portions 4 and 6 whereby all dust, dirt, grit and other comminuted material is prevented from entering the inside of the journal box and the bearing parts mounted and moving therein.

An outer annular raceway member may be fixed to the journal box by utilizing, for convenience of manufacture and assembly, two outer raceway portions 27 and 28, rabbeted together at 29, bolted together by bolts at 30, and clamped in the journal box between the end plates 16 and 17. Thus, the outer raceway member portions 27 and 28 and the securing, clamping and mounting parts therefor may be collectively referred to as an outer raceway member having a generally concaved, preferably curved annular raceway 31, formed therein.

The rotatable bearing members 32 are located as a series in the interval between the inner and outer raceway members for rolling on and between the raceway surfaces 14 and 31; and the rotatable bearing members 32 are preferably ball or spherically shaped and provided with axial trunnions 33, whch terminate in bosses 34 provided with annular preferably V grooves 35.

A series of spacing balls 36 is located between the V-grooved trunnion bosses at each end of the rotatable bearing members 32, which balls 36 are aligned by and retained in the preferably V-grooved raceways 37 and 38 formed in the separate concentric rings 39 and 40, respectively, on the inner and outer sides of each series of spacing balls 36.

The raceway rings 39 and 40 are freely positioned in the interval between the inner and outer raceway members, and also between the raceway members and end plates 16 and 17 so that the raceway rings 39 and 40 may be referred to as freely floating rings.

As best shown in Fig. 4, the raceway rings 39 and 40 may be provided with grooves or notches 39' and 40' respectively, communicating with the V-grooves 37 and 38 respectively thereof, for facilitating the assembling of the balls 36 between their raceway rings 39 and 40. Likewise, two adjacent trunnion bosses 34 of the rotatable bearing members 32 may also be provided with grooves or notches 34' communicating with the V-grooves 35 to permit assembling the last ball 36 into and between the V-grooved raceways 37 and 38 of the floating raceway rings 39 and 40. Of course, it is to be understood that any other desired means may be used for assembling the balls 36 in and between the grooved raceway rings 39 and 40 and the grooved trunnions 34 of the rotatable bearing members 32.

The inner and outer raceway member portions 7, 8, 27 and 28, the rotatable bearing members 32, the spacing balls 36, and the raceway rings 39 and 40 are all preferably formed from hardened steel with the ball and grooved raceway surfaces thereof accurately ground, whereby true rolling contact and motion is obtained between all relatively movable contacting bearing parts.

The concaved inner and outer annular raceways 14 and 31 have slightly greater radii of curvature in cross section than that of the main bearing portion of the rotatable bearing members 32, so that substantially point contact only is obtained between the main bearing portions of the rotatable bearing members 32 and the inner and outer annular raceway members 14 and 31. Likewise, point contact only is obtained between the spacing balls 36, the raceways 37 and 38, and the V-grooves 35 of the trunnion bosses 34.

Moreover, the main bearing portions of the rotatable bearing members 32 in being generally convexed, in being preferably ball or spherically shaped, and in rolling on and between the concaved raceways 14 and 31, enables both radial and thrust loads to be transmitted from the shaft 4 to the journal box; the thrust and radial loads both being carried directly by the rotatable main bearing members 32.

The series of spacing balls 36 rolling on and between the floating rings 39 and 40 and between the rotatable bearing member grooved trunnion bosses 34 are so proportioned and arranged that the centers of the spacing balls 36 are located (Fig. 3) squarely between the axes of the rotatable bearing members 32, and require the rotatable bearing members 32 always to roll in a true planetary manner on the raceways 14 and 31.

Thus, only pure rolling motion occurs between all relatively movable contacting parts of the bearing, and all sliding motion is eliminated, which if present would result in frictional resistance and require lubrication. The result is that the improved bearing may be operated without any lubricant whatsoever; and if the journal box is properly sealed against the entry of comminuted dirt, dust particles, and the like, which have an abrasive action on the moving parts, the bearing may be operated for an indefinite period of time without any grease or liquid lubricant whatsoever. It is, however, to be understood that if desired, a small amount of lubricant of some character may be initially placed within the journal box, more for the prevention of rust than for lubrication purposes, perchance moisture enters into or becomes entrapped within the bearing box.

A slightly modified form of construction is shown in Fig. 5, wherein the inner and outer raceway portions 7a, 8a, 27a and 28a, respectively, are formed to present concaved V-grooved annular raceways 14a and 31a on and between which the rotatable bearing members 32a roll. The rotatable bearing members 32a may be provided with axial trunnions 33a, V-grooved at 35a between which are located the spacing balls 36 rolling between the concentric raceway rings 39 and 40.

Another modified form of construction is shown in Fig. 6, wherein the inner and outer raceway portions 7b, 8b, 27b and 28b, respectively, are formed to present generally concaved and generally V-grooved annular raceways formed by the slightly convexed annular surfaces 14b and 31b, on and between which the rotatable bearing members 32b roll. The rotatable bearing members 32b may be provided with axial trunnions 33b, V-grooved at 35b between which are located the spacing balls 36 rolling between the concentric raceway rings 39 and 40.

I claim:—

1. In anti-friction bearing construction, inner and outer raceway members and rotatable thrust and radial load bearing members rolling on and between the raceway members, trunnions projecting axially of the bearing from each rotatable bearing member between the raceway members, series of spacing balls between the trunnions, and separate concentric floating raceway rings retaining each series of balls.

2. In anti-friction bearing construction, inner and outer raceway members and rotatable thrust and radial load bearing members rolling on and between the raceway members, V-grooved trunnions projecting axially of the bearing from each rotatable bearing member between the raceway members, series of spacing balls between the trunnions rolling on and between the V-grooves thereof and separate concentric floating raceway rings retaining each series of balls.

3. In anti-friction bearing construction, concave inner and outer raceway members and convex rotatable thrust and radial load bearing members rolling on and between the raceway members, trunnions projecting axially of the bearing from each rotatable bearing member between the raceway members, series of spacing balls between the trunnions, and separate concentric floating raceway rings retaining each series of balls.

4. In anti-friction bearing construction, inner and outer raceway members and ball-shaped rotatable thrust and radial load bearing members rolling on and between the raceway members, trunnions projecting axially of the bearing from each ball-shaped rotatable bearing member between the raceway members, series of spacing balls between the trunnions, and separate concentric floating raceway rings retaining each series of balls.

5. In anti-friction bearing construction, V-grooved inner and outer raceway members and ball-shaped rotatable thrust and radial load bearing members rolling on and between the raceway members, trunnions projecting axially of the bearing from each ball-shaped rotatable bearing member between the raceway members, series of spacing balls between the trunnions, and separate concentric floating raceway rings retaining each series of balls.

6. In anti-friction bearing construction, grooved inner and outer raceway members and ball-shaped rotatable thrust and radial load bearing members rolling on and between the grooved raceway members, V-grooved trunnions projecting axially of the bearing from each ball-shaped rotatable bearing member between the raceway members, series of spacing balls between the trunnions rolling on and between the V-grooves thereof, and separate concentric raceway rings retaining each series of balls.

ODELL WILSON.